Jan. 12, 1943.   C. H. CARLSON   2,308,053
SAW FILING MACHINE
Filed Dec. 9, 1940   6 Sheets-Sheet 1

Fig. 1.

Inventor
CHARLES H. CARLSON
By Chas. E. Reif
Attorney

Jan. 12, 1943.  C. H. CARLSON  2,308,053
SAW FILING MACHINE
Filed Dec. 9, 1940  6 Sheets-Sheet 2

Inventor
CHARLES H. CARLSON
By Chas. C. Reif
Attorney

Jan. 12, 1943.  C. H. CARLSON  2,308,053
SAW FILING MACHINE
Filed Dec. 9, 1940  6 Sheets-Sheet 3

Inventor
CHARLES H. CARLSON
By Chas. E. Reif
Attorney

Jan. 12, 1943.  C. H. CARLSON  2,308,053
SAW FILING MACHINE
Filed Dec. 9, 1940  6 Sheets-Sheet 4

Inventor
CHARLES H. CARLSON
By Chas. C. Reif
Attorney

Jan. 12, 1943.  C. H. CARLSON  2,308,053
SAW FILING MACHINE
Filed Dec. 9, 1940  6 Sheets-Sheet 5

Inventor
CHARLES H. CARLSON
By Chas. C. Reif
Attorney

Jan. 12, 1943.    C. H. CARLSON    2,308,053
SAW FILING MACHINE
Filed Dec. 9, 1940    6 Sheets-Sheet 6

Inventor
CHARLES H. CARLSON
By Chas C. Rey
Attorney

Patented Jan. 12, 1943

2,308,053

UNITED STATES PATENT OFFICE 2,308,053

SAW FILING MACHINE

Charles H. Carlson, Minneapolis, Minn.

Application December 9, 1940, Serial No. 369,209

7 Claims. (Cl. 76—77)

This invention relates to a saw filing machine. The machine of the invention is designed to file various kinds of saws including hand saws, circular saws and band saws of various types.

It is an object of this invention to provide a simple and efficient machine which will automatically file or sharpen the saw and put it in the best possible condition for use.

It is a further object of the invention to provide a machine for filing or sharpening saws which will so prepare the teeth of the saw for use that the small burr usually formed on the saw will be most effectively disposed.

It is still another object of the invention to provide a machine for filing or sharpening saws which will file or sharpen a band saw and give a deeper cut on certain teeth at desired intervals.

It is also an object of the invention to provide a machine for filing or sharpening saws in which the saw is moved successively small distances equal to the space between the teeth by engaging the saw at places other than at the teeth.

It is still another object of the invention to provide a machine for filing and sharpening saws comprising a novel saw carrier.

It is still further an object of the invention to provide a machine for filing or sharpening saws comprising a novel combination of drive and driving elements.

These and other objects and advantages of the invention will be fully set forth in the following description made in connection with the accompanying drawings in which like reference characters refer to similar parts throughout the several views and in which:

Figure 1:
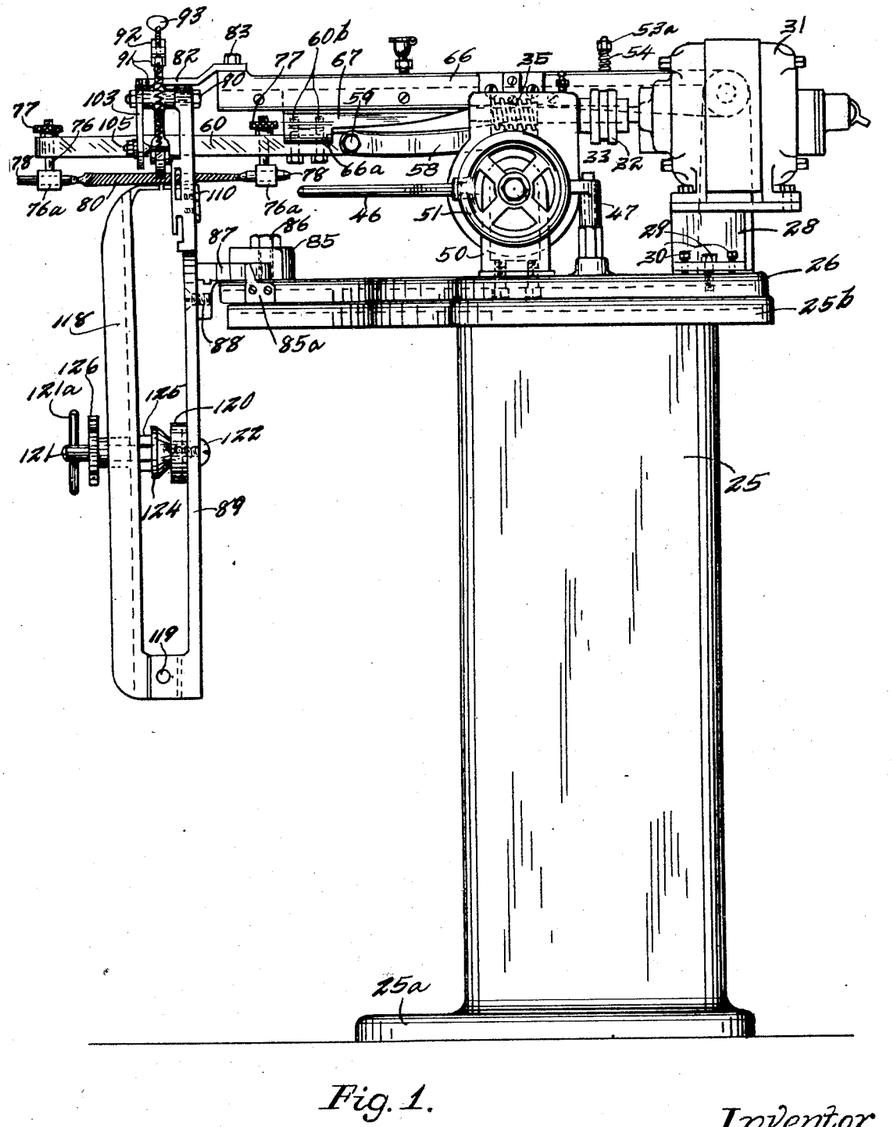
Fig. 1 is a view in side elevation of the machine.
Figure 2:
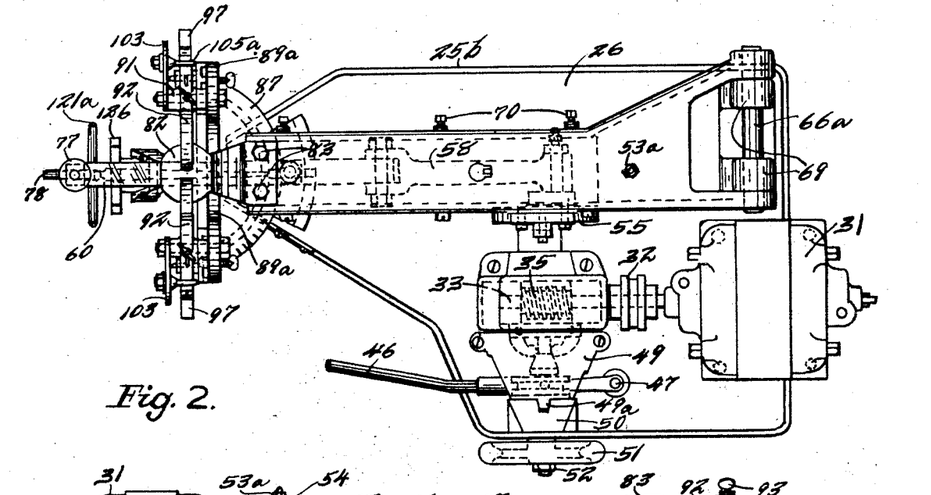
Fig. 2 is a top plan view.
Figure 3:
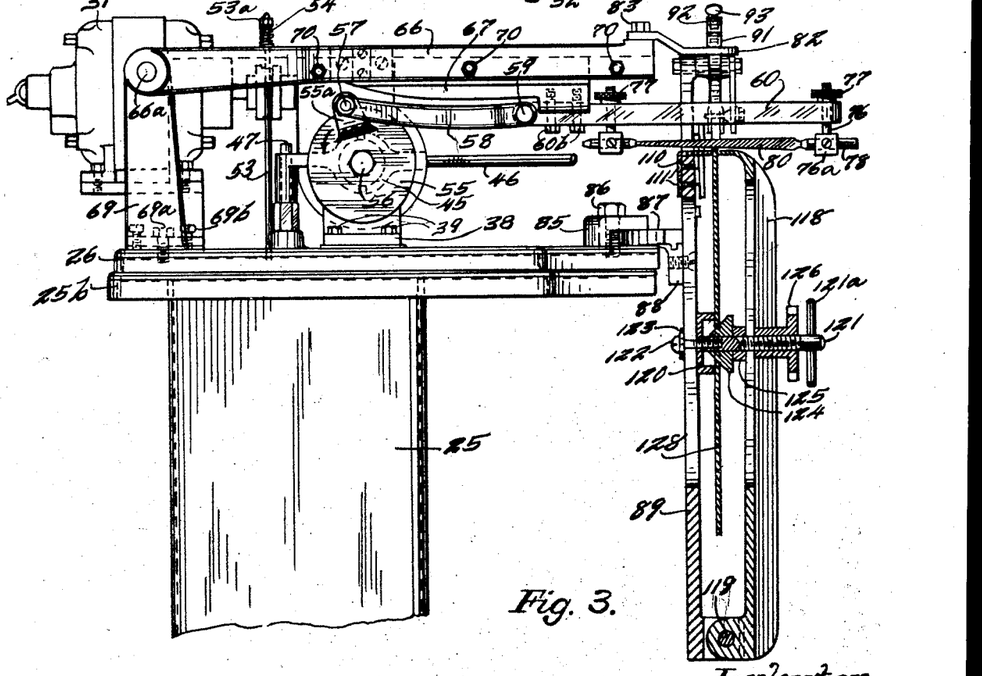
Fig. 3 is a partial view in side elevation as seen from the side opposite that shown in Fig. 1, some parts being shown in vertical section.

Referring to the drawings a machine is shown having an upstanding frame 25, the same having a base flange 25a on which it rests. While frame 25 could be variously formed, in the embodiment of the invention illustrated it is shown as being of the box type substantially rectangular in horizontal cross section and having at its top a horizontal flange 25b. Flange 25b has disposed thereon a top plate or flange 26 which will be secured to flange 25b in any suitable manner as by headed bolts 27. The shape in plan of portions 25b and 26 is clearly shown in Fig. 2. A bracket 28 is secured to plate 26 by the headed bolts 29, the same having a bottom flange through which extend supporting and adjusting screws or bolts 30. Bracket 28 has a flange at its top to which is secured a motor 31 shown as of the electrical type. Motor 31 has its armature or driving shaft connected by suitable transmission mechanism 32 to a shaft 33. While the transmission mechanism 32 could be varied as desired, in the embodiment of the invention illustrated it is shown as a direct coupling. Shaft 33 has secured thereto a worm gear 35, which in turn meshes with a worm wheel gear 36 adapted to rotate on the shaft 37. Shaft 37 is journaled in an upstanding bracket 38 secured to plate 26 by bolts 39. A nut 37b is threaded on shaft 37 adjacent bracket 38 at one side of worm wheel gear 36 and at the other side of said gear shaft 37 is provided with a spline 37a in which is disposed a key 40a secured to a clutch plate 40. A clutch collar or bracket 41 is threaded on shaft 37 adjacent clutch plate 40 and has pivotally mounted therein on the pivots 42 clutch operating arms 43 disposed at opposite sides of shaft 37. Shaft 37 has secured thereto a member 44 having a frusto-conical portion 44a adapted to engage the ends of arms 43. Member 44 has formed thereon parallel clutch collars 44b between which are disposed the arms or portions 45a of a clutch fork or yoke 45. Member 45 has pins 45b projecting into the yoke portion of a clutch lever 46 extending to the front side of shaft 37 and pivoted on a stud 47 secured in plate 26. Shaft 37 and parts 40 to 46 are enclosed in a frusto-conical shell or casing 49. Casing 49 has oppositely disposed lugs 49a extending into recesses in a bracket 50 having an upper portion of frusto-conical form about shaft 37 and extending to plate 26 to which it is secured. Shaft 37 is reduced at its end and has secured thereto a hand wheel 51 held in place by a nut 52 threaded on the end of shaft 37. At its inner end shaft 37 is reduced and has secured thereon a cam and pitman disk 55, the same being held in place by a nut 56 threaded on the end of shaft 37. Disk 55 has an arm 55a at its inner side threaded to receive a headed stud 57 on which is journaled the hub at one end of a pitman link 58. The other end of link 58 is pivotally connected by a headed stud 59 to a reciprocating file-carrying bar 60. Disk 55 has a peripheral cam surface which acts against a cam bar 61 pivotally connected at one end by pivot 62 to a lug 63a projecting from a plate 63 secured by headed screws 64 to a member 65 disposed at one side of an oscillating lever 66. Lever 66 is pivoted at its rear end to a pivot shaft or pin 66a carried in lugs at the upper end of an upstanding bracket 69 secured to plate 26 by bolts 69a. Bracket 69 also has a flange at its bottom through which extend supporting and adjusting screws 69b. As shown in Fig. 2 lever arm 66 has spaced lugs through which pin 66a extends and these are disposed at the outer sides of the spaced lugs at the top of bracket 69. A rod 53 is secured in member 26 and extends vertically through arm 66. A spring 54 is disposed between the top of arm 66 and a nut 53a on the top of rod 67.

Figures 10, 12, 13, 14, 15:
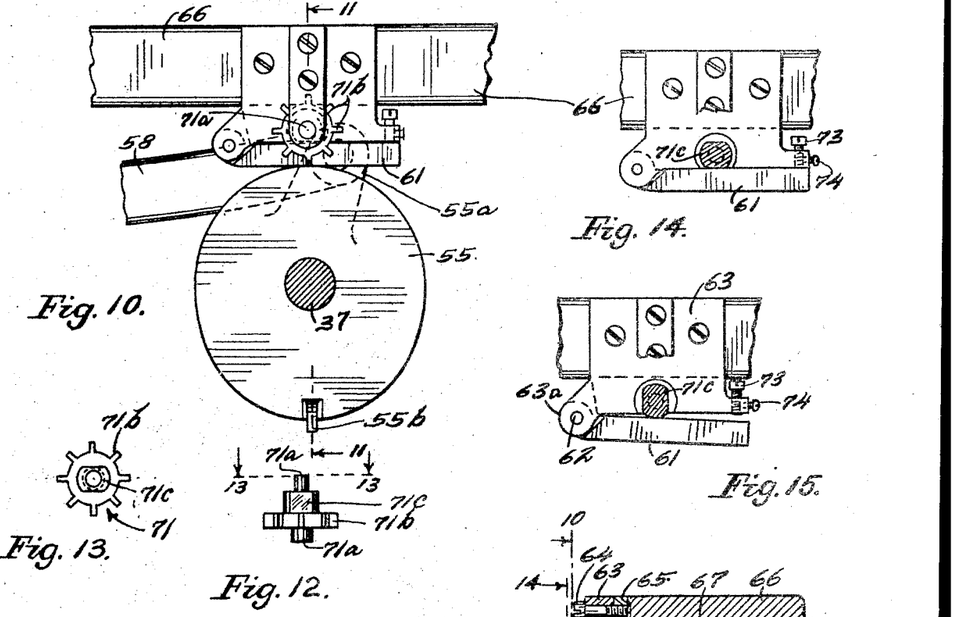
Fig. 10 is a vertical section taken on line 10—10 of Fig. 11 as indicated by the arrows.
Fig. 12 is a top plan view of a cam mechanism member.
Fig. 13 is a view in front elevation of the member shown in Fig. 12, as seen from line 13—13.
Fig. 14 is a vertical section taken on line 14—14 of Fig. 11 as indicated by the arrows.
Fig. 15 is a view similar to Fig. 14 showing the parts in different positions.
Figure 11:
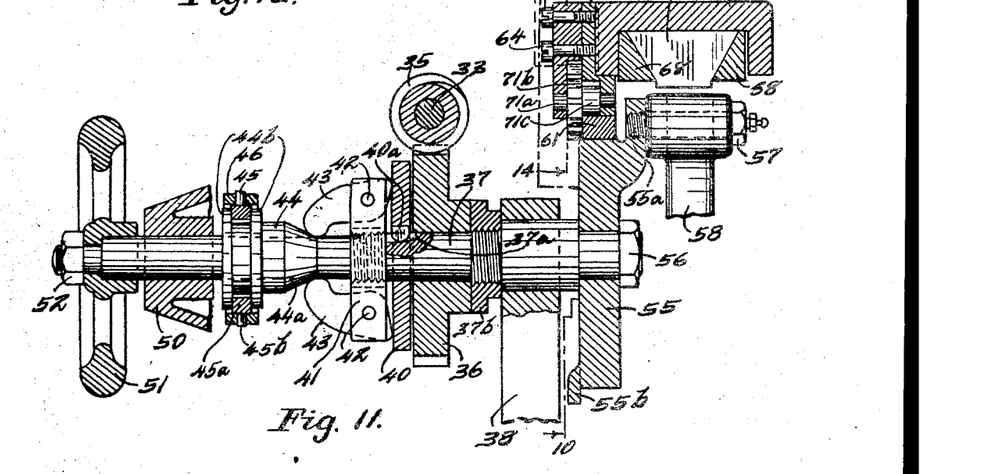
Fig. 11 is a vertical section taken substantially on line 11—11 of Fig. 10 as indicated by the arrows.

A cam operating member or star wheel 71 is provided, the same having cylindrical journal portions 71a at its ends which are journaled respectively in bores in plates 63 and 65 as shown in Fig. 11. Member 71 has the star wheel portion 71b with lugs projecting in circumferentially spaced relation therefrom, the same being shown as eight in number. Member 71 also has a cam portion 71c, which as shown in Figs. 13, 14 and 15 is provided with flattened opposite sides, the same being otherwise cylindrical. As shown in Fig. 11 portion 71c overlies the bar 61. As shown in Figs. 14 and 15 when the flat sides of portion 71c are horizontal bar 61 may occupy a higher position than when said flattened portions are vertical as shown in Fig. 15. In the latter position the cylindrical part of portion 71c engages bar 61. Disk 55 has thereon a projecting tooth 55b adapted to engage the teeth of star wheel portion 71b. Plate 63 is provided with a flange at the side opposite lug 63a through which extends a headed screw 73 adapted to engage the top of bar 61. Screw 73 can be held in adjusted position by a smaller screw 74 threaded into said flange and engaging screw 73.

The member 60 is shown as provided with spaced vertical slots extending therethrough, through which extend pins 76 secured to blocks 76a, said pins having their ends threaded to receive knurled adjusting nuts 77. Members 78 extend through the blocks 76a and are constructed and arranged to hold the ends of a file 80 which is used to file or sharpen the saw. Members 78 are held in desired adjusted position by set screws 79. Pins 76 can be held firmly in position by means of set screws 81 extending through the side of member 60. Lever arm 66 has downwardly extending side portions forming a channel at its underside and a crosshead 67 reciprocates substantially centrally of said channel, the same having inclined sides engaged respectively by gibs 68. Gibs 68 are held in place by longitudinally spaced and headed screws 70 equipped with lock nuts 70a. Crosshead 67 has a downwardly extending portion in which file-carrying member 60 is received and to which it is secured by the headed screws 60b. Member 66 has a plate 82 secured to its front end by spaced bolts 83, which plate has a forward downwardly offset portion having a flat top surface engaged by certain members to be later described.

The plate 26 at its forward end has secured thereto a clamping member 85 secured by a bolt 86 beneath which is held a bracket 87. As shown in Fig. 2 bracket 87 has an arcuate flange disposed beneath bracket 85 and is graduated for adjustment. A pointer 85a is secured to member 26 adjacent member 87. Bracket 87 has secured thereto by bolts 88 having countersunk heads, a vertically extending bracket 89. Bracket 89 has upper spaced portions 89a bored to receive and hold headed stationary studs 90. Journaled on each stud 90 is a lever 91. Levers 91 each have pivoted to its upper end a lever 92. Levers 92 have adjacent ends resting on the top of plate 82 and extending away from said plate in symmetrical relation to the center line of bracket 89. Each lever 92 has threaded therein a thumb screw 93 which engages with a shoulder portion 91a formed on each lever 91. Levers 92 also have secured to their remote sides tensile coiled springs 94 which extend downwardly and are secured at their lower ends to lugs 91b respectively which are disposed at the outer sides of levers 91. Springs 94 thus urge the outer ends of levers 92 downwardly and hold the ends of screws 93 against shoulders 91a. Pivotally secured to the lower ends of levers 91 by pivots 96 are pawls 97. Pawls 97 are provided with top surfaces and each has a downwardly and outwardly sloping riding surface 91a. While this surface might be variously formed or disposed, in the embodiment of the invention illustrated it extends at an angle of substantially 45 degrees to the top surfaces of member 97. Each pawl 97 comprises a portion 99 pivotally secured to its inner end by a pivot 98. Each portion 99 can be brought into rectilinear alinement with its main portion 97 at which time a small screw 100 engages a recess 99a in portion 99 or said portion 99 can be swung to inoperative position substantially at right angles to its main portion 97 as shown at the right hand side of Fig. 7 at which time recess 99a moves out of engagement with screw 100. It will be noted that the lower end of each lever 91 is bifurcated and embraces its pawl 97. Each arm 97 has a lug 97b at its top apertured to have secured thereto the lower end of a tensile coiled spring 101, the upper end of which is secured to lug 91b. The outer end of each pawl 97 is thus urged upwardly. Secured in stationary position on the outer end of each stud 90 at the end of the pivot hub of its lever 91 is an arm 103, the same being held in place by a nut 104 threaded on the forward end of stud 90. Each arm 103 extends downwardly and is provided with a longitudinally extending slot 103a. A stud 105 formed at its inner end as a cylindrical pin 105a is secured in slot 103a held in place by a nut and washer 106 and 107 respectively. Pin 105a overlies the top surface of its pawl 97 and permits movement of said pawl to engage the saw.

Bracket 89 has secured adjacent its top a right angled bracket or plate 110, the same being shown as held by countersunk screws 111. The top portion of plate 110 extends over the upper portion of bracket 89 at the central recess therein and forms the inner jaw of a vise. Plates 114 are secured to the front of bracket 89 adjacent its upper portion by the countersunk screws 115, said plates being secured to lugs projecting a short distance forwardly of bracket 89 so that slots 116 and 117 are formed by plates 114. Cooperating with the plate 110 is a swinging member 118 having a lug at its bottom pivoted between spaced lugs on bracket 89 by the headed and nutted bolt 119. Member 118 is curved inwardly to have a horizontal top portion which cooperates with plate 110 and forms the outer jaw of said vise. Member 118 has a rather long central and vertical slot 118a therethrough. Bracket 89 also has a central vertical slot therethrough and a cup-shaped member 120 is secured against the outer side of said bracket, the same being held in place by a screw 121 which is bored and threaded at its inner end to receive a holding screw 122 passing through the slot in bracket 89 and having a head at the inner side of said bracket beneath which is disposed a washer 123 engaging said bracket. An arbor member 124 of substantially conical form is journaled on screw 121 and a nut 125 is threaded on said screw between said arbor and member 118. A nut 126 having a star wheel handle at its outer side is threaded on screw 121 at the outer side of member 118, screw 121 being provided with a pin handle 121a extending through its outer end. In Fig. 3 a circular saw 128 is shown as having a central opening into which arbor 124 extends, said saw being held against member 120 so that said saw is revolubly supported upon arbor 124.

Figures 4, 5, 6:
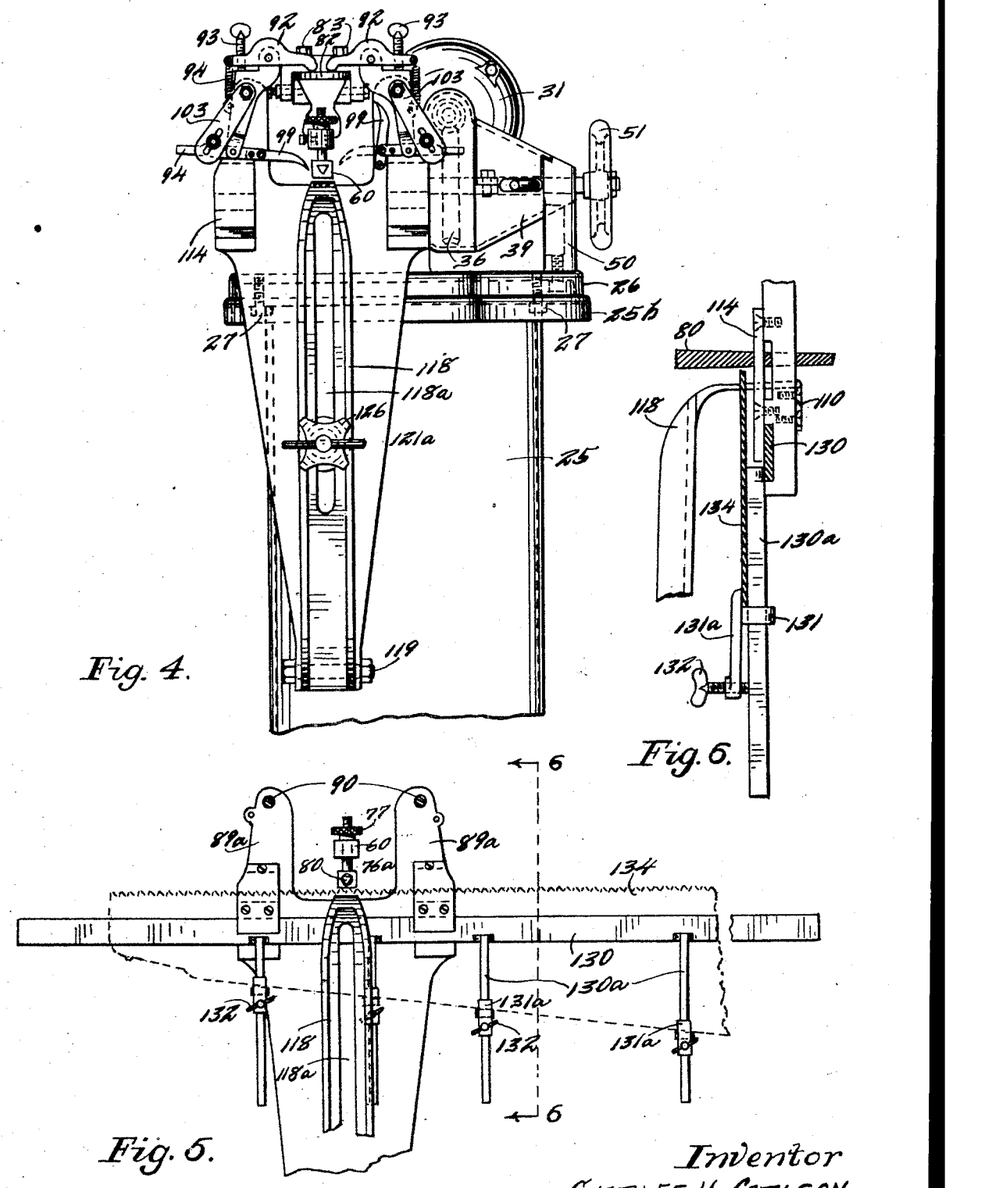
Fig. 4 is a partial view in front elevation.
Fig. 5 is a partial view in front elevation showing a saw carrying rack.
Fig. 6 is a vertical section taken on line 6—6 of Fig. 5 as indicated by the arrows.

In Figs. 5 and 6 a saw carrier is shown comprising an elongated bar 130 rectangular in cross section and of a size to be received in slots 116 and behind plates 114. Bar 130 has secured thereto as by welding depending bars 130a. Bars 130a have slidable thereon apertured members 131 to which are secured the vertically extending lugs 131a having lower ends bored and threaded to receive thumb screws 132. A hand saw 134 can be placed on members 131 and in front of bars 130a, the same being in the rear of the upper ends of lugs 131 which extend above members 131. The screws 132 can be rotated to engage the bars 130a respectively, members 131 having slight movement on bars 130a. The upper ends of lugs 131a can thus be adjusted to have the desired pressure on the lower edge of saw blade 134. The jaws of the vise formed by members 110 and 118 will be brought against opposite sides of the saw blade 134 at its upper end by adjustment of nut 126 so that there will be the desired holding and friction on saw blade 134.

Figures 7, 8, 9:
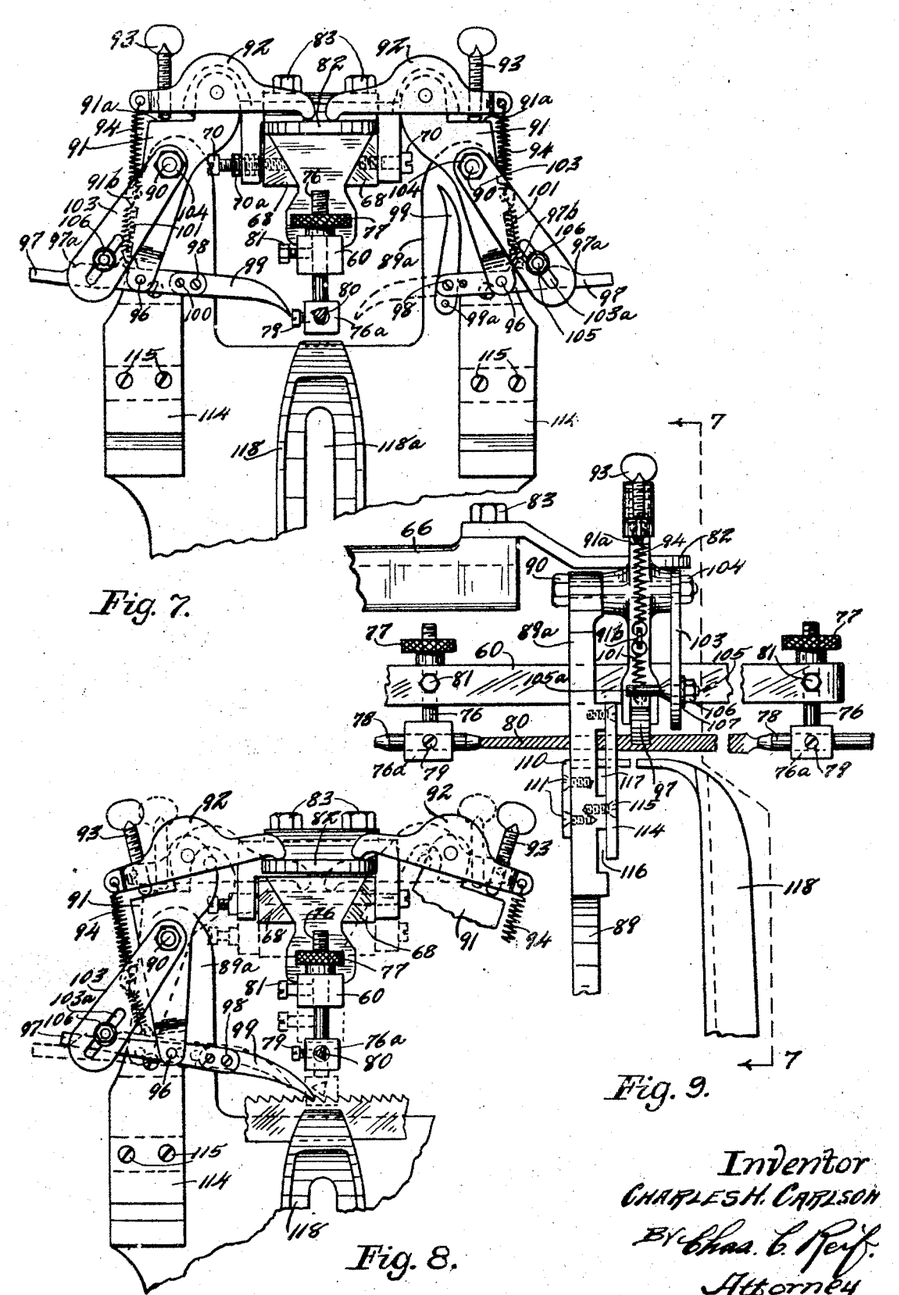
Fig. 7 is a vertical section taken on line 7—7 of Fig. 9 as indicated by the arrows.
Fig. 8 is a partial view in front elevation, some parts being shown in different positions in dotted lines.
Fig. 9 is a partial view in side elevation, some parts being removed.

In operation motor 31 will be operated and this will rotate shaft 33 and worm gear 35 so that worm wheel gear 36 will be rotated. A file such as shown as 80 will be placed and held between members 78 so that the same will be reciprocated by the member 60. The saw being in place the machine can now be operated by engagement of the clutch disk 40. This can be effected by movement of clutch handle 46. This will move member 41 outwardly on shaft 37 so that the outer ends of arms 43 will be moved away from each other which will cause said arms to swing and cause the inner ends of said arms to move disk 40 against the outer face of worm wheel gear 36. Disk 40 is then rotated by gear 36 and this drives shaft 37 through the key 40a. Rotation of shaft 37 rotates the disk 55. Rotation of disk 55 reciprocates crosshead 67 through movement of link 58. Reciprocation of crosshead 57 reciprocates member 60 and thus the file 80. At each revolution of shaft 37 the cam periphery of disk 55 raises bar 61 and thus the lever arm 66 and the forward portion of arm 66 is thus raised some distance and member 60 and file 80 are raised during reciprocation in one direction. Spring 54 urges and moves arm 66 downwardly. This is usually a reciprocation when the file is moving outwardly or forwardly. The pawl 97 which is being used, such as the one at the left as shown in Fig. 8, will engage the successive teeth of the saw and move the saw a distance of one tooth at each oscillation. As the outer end of lever arm 66 is raised the plate 82 oscillates the lever 92. This through the screw 93 oscillates arm 91 and this gives the pawl 97 a combined reciprocating and swinging movement. When the inclined portion 97a of pawl 97 moves past the pin 105a this permits the inner end of the pawl to drop or move downwardly and the pointed end of pawl portion 99 engages a tooth of the saw and the saw is moved during the remainder of the movement of pawl 99 and arm 91. This amount of movement is determined by trial and observation and the proper adjustment can be made by properly locating stud 105 and turning thumb screw 93. The machine thus operates to move file 80 outwardly, then to lower said file and draw the same inwardly against the edges of the teeth. The file is then raised due to operation of cam 55 and the lever arm 66 acts to feed the saw another notch or distance of one tooth as file 80 moves outwardly. The operation is then repeated. In filing or sharpening band saws such as illustrated in Fig. 8 it is desired to have the space between the teeth at certain intervals cut somewhat deeper. In the rotation of disk 55 tooth 55b will engage star wheel 71b and change the position of the cam portion 71c. When this cam portion is turned to the position shown in Fig. 14 with its flat sides horizontal bar 61 moves to a higher position and the lever arm 66 can thus move downwardly a greater distance and move the file 80 downwardly a greater distance. When the cam portion 71c is turned to the position shown in Fig. 15 bar 61 is lowered and lever 66 will be prevented from coming down so far and file 80 will not cut as deeply into the saw. With the construction shown having eight teeth on star wheel 71b every fourth space is cut somewhat deeper. The number of teeth on the star wheel could of course be varied to give the deep space at the desired interval. If the operation of cam portion 71c is not desired, as when operating on a hand saw, bar 61 can be maintained in the position shown in Fig. 15 by adjustment of screws 73 and 74. This renders cam portion 71c inoperative. The operation is the same whether the saw is moved horizontally in the saw carrier shown in Figs. 5 and 6 or whether it is a circular saw mounted as shown in Fig. 3. The circular saw merely rotates through the distance of the tooth space.

The machine can be turned over or operated by hand by turning hand wheel 51. This rotates shaft 37 and disk 55. This will be desirable at times especially when adjusting the parts for proper feeding of the saw.

Referring to Figs. 16 to 20 a device is shown comprising a bracket 150. This will be mounted on member 89 already described. Said bracket will be secured by a headed bolt 151 extending through slot 89a. A washer 152 underlies the head of bolt 151 and said bolt is threaded into a block 153 welded or otherwise secured to the rear of bracket 150. Bracket 150 which is generally in the form of a rectangular plate has secured thereto adjacent its lower edge a laterally extending arm 150a. Arm 150a has a forwardly projecting lug 150b which is bored and threaded to receive the lower end of a screw 154 having an enlarged cylindrical upper end having extending therethrough and secured therein a handle-forming pin 154a. The said enlarged upper end has a lower frusto-conical surface 154b which rests upon the upper side of a lever arm 155. The outer end of lever arm 155 is reduced in thickness and curved at its upper and lower side, the same having extending vertically therethrough a slot 155a through which screw 154 passes. A compression coiled spring 156 surrounds screw 154 bearing at its lower end against the upper surface of lug 150b and bearing at its upper end against a washer 157 engaging the lower convex side of the outer end of lever 155. Lever 155 is pivoted about the stud 158 secured in bracket arm 150a and equipped at the outer side of lever 155 with a nut 159, said stud having an enlarged portion between arm 150a and lever 155. Lever 155 is provided with an open-ended longitudinally extending slot 155b at its other end through which passes a stud 160 having a reduced portion disposed in slot 155b. Stud 160 is secured to a carrier bracket 162 having flanges at its sides embracing the bracket 150 and slidable thereon. It will thus be seen that by turning screw 154 lever 155 will raise or lower carrier bracket 162. Bracket 162 carries at its upper end a plate 163. Plate 163 has a pair of spaced arcuate slots 163a therein through each of which passes a stud 164, the same being equipped with a nut 165 at the outer side of plate 163 beneath which is a washer 166. Plate 163 can thus be adjusted to position with its top horizontal or it may be positioned with said top at an angle to the horizontal. Plate 163 is provided with a slot in its upper surface in which a saw blade 168 such as a band saw blade is adapted to snugly fit and be slidable therein. Plate 163 also has a vertical slot 163b adjacent its side as shown and said plate is equipped on its rear side with a vertical groove 169a rectangular in horizontal cross section in which fits a tongue or rib 169b forming part of a bar 169 which projects at the right of bracket 163 as shown. A headed screw 170 having a washer 171 under the head thereof extends through slot 163b and into bar 169 so that said bar may be adjusted vertically and held in different positions. Slidable on bar 169 is a bracket 173 having strips 173a at its ends extending about and embracing bar 169 so as to fit snugly thereon and be slidable thereon. Bracket 173 has an upwardly extending portion provided with a T-slot 173b and adapted to receive the lower partly cylindrical end of a propelling dog 174. Bracket 173 also has a forwardly projecting portion 173c in which is secured a stud 175 having one end riveted in portion 173c. Stud 175 projects at one side of portion 173 and a dog 176 is provided with a slot 176a through which stud 175 passes. A compression coiled spring 177 shown as of frusto-conical form engages dog 176 at its larger end and at its smaller end engages a washer 178 which is held on stud 175 by a nut 179 threaded on said stud. Dog 176 projects at one side of portion 173c and has a handle portion 176b extending at an angle to the main body of said dog. Portion 173c has at its end a laterally projecting lug 173d which is threaded to receive a headed screw 180 provided with a lock nut 181 which engages the outer side of lug 173d. The end of screw 180 overlies and is adapted to engage the adjacent edge of dog 176 as clearly shown in Fig. 20. The member 174 already referred to is provided with a central longitudinal slot 174a thru which extends a screw 182 securing member 174 to its carrier 184 which is in the form of a lever having a hub 184a oscillatably mounted on a stud 185 carried in one bracket portion 89a already described. Stud 185 is provided with suitable nuts 186. Lever arm 184 like the lever arms 91 is pivotally connected to a member 188 similar in all respects to members 92 already described and having an end adapted to overlie and be engaged by the top surface of member 82. A tensile coiled spring 189 has one end connected to the outer end of lever 188 and its other end connected to a lug on lever 184 disposed below pivot stud 185. A thumb screw 190 is threaded into lever 188 and at its lower end engages the shouldered surface formed on lever 184.

Figures 16, 17:
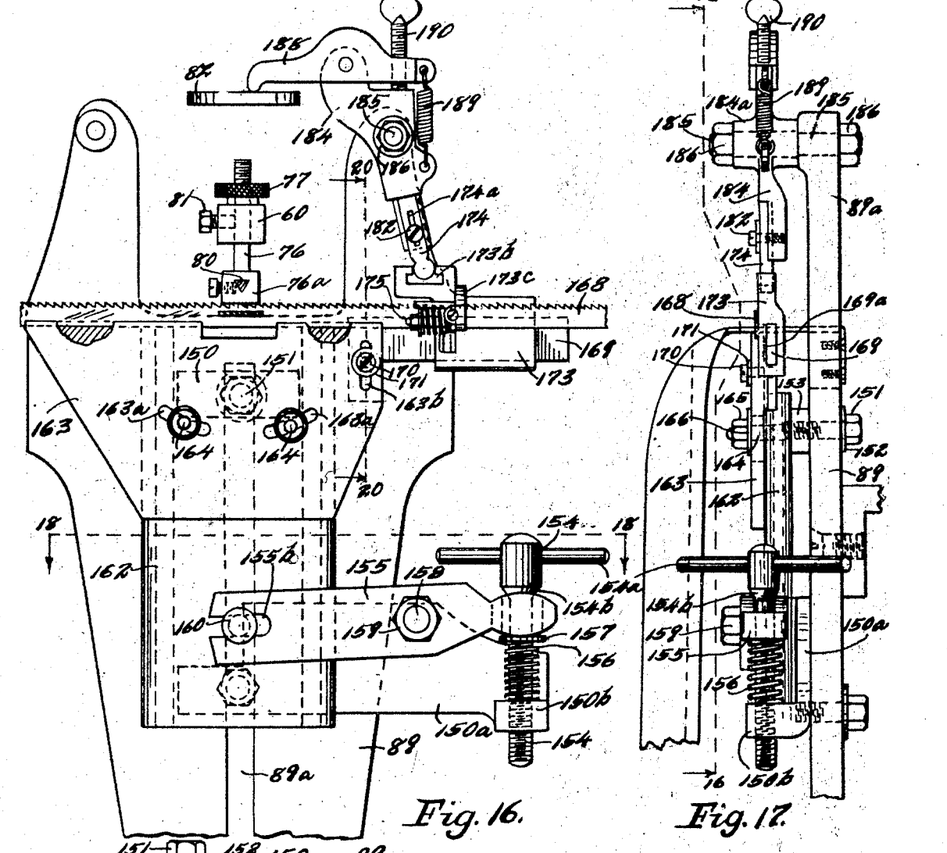
Fig. 16 is for the most part a view in front elevation of a modification or attachment for the machine, some parts being broken away and others shown in vertical section on line 16—16 of Fig. 17.
Fig. 17 is a view in side elevation as seen from the right of Fig. 16.
Figures 18, 19, 20:
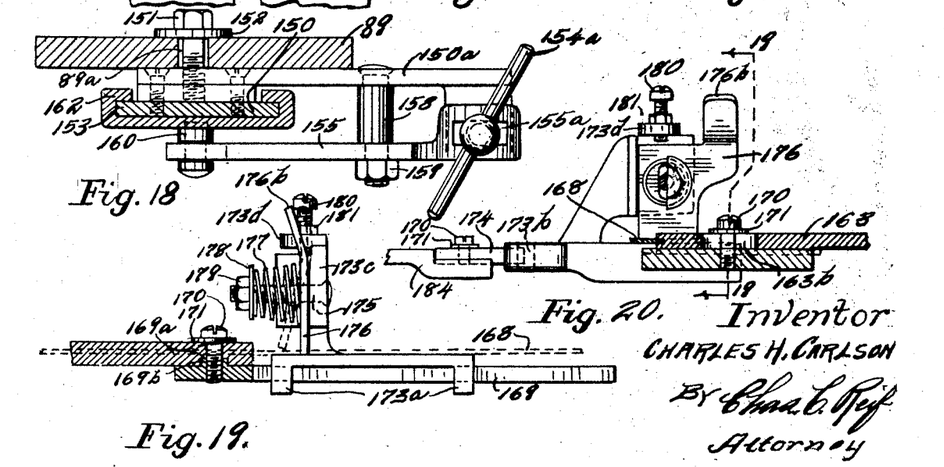
Fig. 18 is a horizontal section taken on line 18—18 of Fig. 16 as indicated by the arrows.
Fig. 19 is a vertical section taken on line 19—19 of Fig. 20 as indicated by the arrows.
Fig. 20 is a vertical section taken on line 20—20 of Fig. 16 as indicated by the arrows.

The attachment shown in Figs. 16 to 20 is used for the purpose of progressing the saw blade without engaging the teeth of said saw. This is sometimes desirable as the very small burr formed on the teeth can be left undisturbed. The saw 168 will be placed in the slot in the top of bracket 163 as shown and the vise jaws on members 118 and 110 will be suitably engaged with opposite sides of said blades. The operating file 80 will be used as previously described. When member 82 is raised and lowered as already described lever 188 will be oscillated as will also lever arm 184. This will oscillate member 174. As member 82 is raised and member 174 moves to the left as shown in Fig. 16, bracket 173 will be moved to the left on its guide bar 169. This moves portion 173c and dog 176. Dog 176 is adjusted so that as said bracket 173 moves the inner edge of said dog will engage and bind against saw blade 168 as shown in Fig. 20. Said dog will thus grip saw 168 and move it to the left. This movement can be adjusted in extent by adjustment of screw 190. Propelling member 174 can be suitably adjusted in relation to bracket 173 by screw 182. When member 82 descends spring 189 will swing lever 184 and propelling member 174 to the right. This will slide bracket 173 to the right and when this occurs dog 176 will swing about its edge adjacent screw 180 or its outermost edge as indicated in dotted lines in Fig. 19 and will not bind against the saw blade 168 but will merely slide along the saw. Dog 176 has rather free movement on stud 175 and its swinging movement is readily permitted by spring 177. The saw blade 168 is thus reciprocated the desired amount with each oscillation of levers 184 and 188. The bracket 163 can be brought to the proper height by turning screw 154. It is sometimes desired to undercut the teeth of the saw or in other words to have the short side of the tooth extend at an acute angle to the opposite edge of the saw blade rather than at right angles thereto. This effect can be secured by adjustment of bracket 163.

It will thus be seen that I have provided a means for progressively moving the saw to be sharpened without propelling the same by engagement of the teeth of the saw. This means has advantages in sharpening certain kinds of saws. Obviously the operation of the cam 55 and member 71 will be the same using the saw propelling means shown in Figs. 16 to 20 as in the other mechanisms shown and described.

From the above description it will be seen that I have provided a greatly improved structure of saw filing machine. The same is compact, comprises a minimum of parts and affords all the adjustments necessary for properly filing and sharpening the saw. The feeding pawls, when these are used, do not engage the last filed tooth of the saw if this is not desired. It will also be seen that I have provided an improved structure for controlling the movement of the feeding pawl toward and from the saw. Instead of having a cam arm which determines the movement of the pawl the movement is obtained by the swinging movement of the pawl itself. The pin 105a can be adjusted in its bracket 103 and said bracket may also be adjusted to give the desired movement to the pawl. It will also be noted that the pin 105a is at the rear of the pivot which connects the pawl to its swinging member. The combination for reciprocating the file and arm 66 is also novel and efficient and the provision of the clutch which may disconnect the driving mechanism so that the machine can be turned over by hand wheel 51 is also very convenient. The machine as described automatically provides for making a deeper cut on a tooth at desired intervals. The machine has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A saw filing machine having in combination, means for holding a saw for progressive movement, a pawl for engaging the teeth of said saw for progressively moving the same, a swinging member carrying said pawl for oscillating the same, a lever for variably actuating said swinging member, an adjustable bracket adjacent said pawl and a member adjustably mounted in stationary position on said bracket, said pawl having a surface on the body thereof cooperating with said member in the movement of said pawl to move the latter toward said saw.

2. A saw filing machine having in combination, means for holding a saw for progressive movement, a pawl for engaging the teeth of said saw for progressively moving the same, a swinging member carrying said pawl for oscillating the same, a lever to which said member is pivoted having means for actuating said member, an adjustable pivoted bracket held in stationary position adjacent said pawl and a member projecting from said bracket overlying said pawl, the body of said pawl having on its top a surface cooperating with said member in the movement of said pawl for moving the latter toward said saw.

3. A saw filing machine having in combination, means for holding a saw for progressive movement, a pawl for engaging the teeth of said saw for progressively moving the same, a member carrying said pawl, a pivot about which said member is oscillated, an adjustable bracket adjacent said pawl swingable about said pivot, to be held in different stationary positions relative thereto, a member on said bracket, the body of said pawl having a top surface at the side of said pivot remote from its operative end cooperating with said surface in the movement of said pawl for raising said pawl and permitting movement of the same toward said saw said member being movable to different positions longitudinally of said bracket.

4. A saw filing machine having in combination, means for holding a saw for progressive movement, a vertically movable member, a lever having one end engaged by said member and oscillated thereby, a swinging member pivotally connected at its upper end to an intermediate point on said lever, said swinging member having an upper surface thereon, an adjustable member carried by said lever at the side of its pivot remote from said end engaging said surface for oscillating said swinging member, a pawl pivotally connected to the lower end of said swinging member, an adjustable bracket adjacent said pawl, a member adjustably carried in said bracket adapted to engage the top of said pawl, the body of said pawl having an inclined surface on its top acted upon by said last mentioned member and resilient means holding said pawl and last mentioned member in engagement.

5. A saw filing machine having in combination, means for holding a saw for progressive movement, a pawl for engaging the teeth of said saw for progressively moving the same, a swinging member to which said pawl is pivotally connected, a lever pivotally connected to said swinging member, means for oscillating said lever, means carried by said lever for oscillating said swinging member and pawl, a bracket adjacent said pawl, an adjustable member carried in said bracket, said pawl having an inclined surface thereon engaged by said last mentioned member and a spring for holding said pawl in engagement with said last mentioned member.

6. A saw filing machine having in combination, means for holding a saw for progressive movement, a frame, a swinging member pivoted intermediate its ends on said frame and having a surface above said pivotal connection, a lever pivoted intermediate its ends to the upper end of said swinging member, means engaging one end of said lever for oscillating the same, a member adjustably carried by said lever adjacent its other end engaging said surface to move said swinging member, a spring for holding said last mentioned member in engagement with said surface, a pawl pivotally carried by said swinging member below said pivotal connection and means for moving said pawl to cause said pawl to engage said saw.

7. A saw filing machine having in combination, a frame, means for holding a saw for progressive movement, a swinging member pivoted intermediate its ends to said frame, a lever pivoted intermediate its ends to said swinging member above the pivotal point of the latter, means engaging one end of said lever for oscillating the same, means carried by said lever engaging said swinging member to oscillate the latter and to vary the relative positions of said lever and swinging member, a pawl carried by said swinging member below its pivotal connection, a member engaging said pawl for oscillating said pawl to cause said pawl to engage said saw and resilient means holding said pawl and last mentioned member in engagement.

CHARLES H. CARLSON.